United States Patent Office 3,078,293
Patented Feb. 19, 1963

3,078,293
SILATRIOXANES
Hans H. Ender, Buffalo, N.Y., assignor to Union Carbide Corporation, a corporation of New York
No Drawing. Filed Sept. 23, 1960, Ser. No. 57,894
13 Claims. (Cl. 260—448.8)

This invention relates to novel organosilicon compounds, more particularly to silatrioxanes, and to novel processes for the preparation of these silatrioxanes.

My novel silatrioxanes include monosilatrioxanes which are readily understood by reference to the following formula:

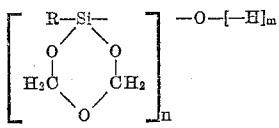

wherein R is a monovalent hydrocarbon group, preferably containing from 1 to about 10 carbon atoms, $m$ is an integer having a value from 0 to 1, $n$ is an integer having a value from 1 to 2 and the sum of $n$ and $m$ is 2. Thus, my novel compounds include cyclic silatrioxanes having the following formulas:

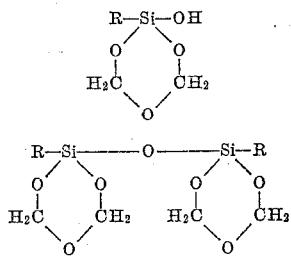

where R is as previously defined.

The compounds of this invention include those represented by Formulas I and II where R in each case can be methyl, ethyl, propyl, phenyl, vinyl, allyl, octyl, cyclohexyl, n-butylphenyl, mesityl and the like. In the compounds of Formula II, the two R groups can be different monovalent hydrocarbon groups.

My novel process for preparing silatrioxanes comprises the reaction of formaldehyde, a monovalent hydrocarbon trichlorosilane, $RSiCl_3$ (where R has the meaning previously defined), and water at a temperature in the range of $-30°C.$ to $60°C.$ and continuously removing hydrogen chloride from the reaction. This reaction is illustrated by the equations:

(A)
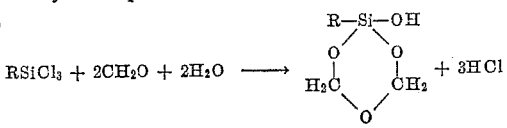

(B)
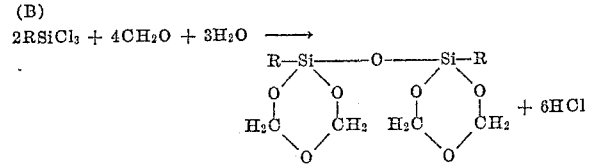

The theoretical molar quantities of trichlorosilane, formaldehyde, and water shown by the above equations are preferred. However, variances can be made in the molar ratios of reactants with the exception of the molar ratio of water to trichlorosilane which should be limited to 3 or less. Even large excesses of $CH_2O$ do not hinder the reaction. Molar ratios of water to trichlorosilane of over 3 are not advantageously employed because of the formation of siloxane polymers thus resulting in lower yields and complications in the recovery of my novel compounds. The silatrioxane products obtained comprise mixtures of the compounds represented by Formulas I and II along with relatively small quantities of polymeric silatrioxanes. Compounds of the Formulas I and II can be separated from such mixtures as by fractional distillation, or the mixtures themselves can be employed as they are (without fractional distillation) after removal of excess reactants, hydrogen chloride, solvents, and other reagents. When separating the compounds of Formulas I and II from the reaction mixture and from each other, pressures below about 5 mm. Hg are preferred. The higher temperatures required when higher distillation pressures are employed result in some thermal decomposition of the desired products. For example, the compounds of Formulas I and II distill readily at 3 mm. Hg when R is methyl and at 1 mm. Hg when R is vinyl.

In order to obtain a predominance of the compounds represented by Formulas I and II, the respective molar quantities of reactants shown by Equations A and B are preferred although other variances can be employed. Thus, the molar ratio of water to trichlorosilane should not be greater than 3 and the molar ratio of $CH_2O$ to trichlorosilane can be as low as one. When molar ratios of $CH_2O$ to trichlorosilane of less than one are employed, large quantities of polymeric material are obtained in the product. Compound I and compound II are then separated, if desired, or employed as a mixture.

An advantageous procedure for conducting my process is to slowly add (e.g. in a dropwise manner) a mixture or solution of the trichlorosilane and a hydrogen chloride acceptor to water and a source of formaldehyde which is preferably in solution and cooled by an ice bath or other cooling means. The ensuing reaction is strongly exothermic. Hence, the rate of addition is adjusted to maintain a low temperature consistent with the efficiency of the cooling means in removing heat formed. Usual addition times vary from 5 minutes to one hour. The reaction is essentially complete after all of the trichlorosilane-hydrogen chloride acceptor mixture or solution has been added. During the reaction a thick slurry may form, for example, when pyridine is employed as the hydrogen chloride acceptor. If such a slurry becomes too thick to permit ease of handling, an ether or other solvent is added any time before, during, or after reaction. After the reaction is complete, extraction of the reaction mixture with ether is performed to recover the products from residues such as pyridine hydrochloride formed during reaction. Other methods such as filtering and/or washing with water can be employed to remove the products from residues. The ether extract is washed with water two or three times or more if necessary. The washing operation should preferably be carried out quickly with cold water, since the desired products undergo some hydrolysis on long contact with water and considerable hydrolysis if the water is hot. Contact with cold water for periods up to 30 minutes does not cause any extensive hydrolysis of the products. The washed extract is then dried with a drying agent, for example, anhydrous $Na_2SO_4$, $CaSO_4$, $CaCl_2$ or crystalline zeolitic molecular sieves, and filtered. The ether of the extract is removed as by evaporation under reduced pressure to yield the products. If necessary, the products are separated as by fractional distillation or used without separation.

Hydrogen chloride acceptors are a convenient means for removing hydrogen chloride from the reaction, although other means, such as pumping off the hydrogen chloride under reduced pressure, are within the skill of workers in the art. Examples of hydrogen chloride acceptors are pyridine, quinoline, alkylated pyridines, anhydrous ammonia, monoalkyl amines, dialkyl amines, trialkyl amines, piperidine, hexamethylene tetramine, and other compounds capable of readily combining with hydrogen chloride. Pyridine is the preferred hydrogen chloride acceptor. The preferred pH range of the reaction mixture is from 4 to 8 with pH's of 6.5 to 8 providing the best yields. Siloxane polymer formation is strongly encouraged at pH's outside the range of 4 to 8 resulting in lowered yields of product. Thus, the preferable amount of hydrogen chloride acceptor employed is that which is capable of preventing the pH of the reaction mixture from exceeding the limits of 4 to 8.

A source of formaldehyde is provided for the reaction by any suitable means. Formaldehyde can be bubbled as a gas into the reaction mixture or it can be provided for reaction by formaldehyde donors such as polyoxymethylene (commonly called para-formaldehyde), dimethylol acetone, aqueous solutions of formaldehyde or aliphatic alcoholic solutions of formaldehyde (such as formaldehyde in methanol, ethanol, propanol, butanol, and the like).

Examples of trichlorosilanes which can be employed in my process are methyltrichlorosilane, ethyltrichlorosilane, phenyltrichlorosilane, vinyltrichlorosilane, allyltrichlorosilane, cyclopentyltrichlorosilane, nonyltrichlorosilane, (phenylethyl) trichlorosilane, and the like.

Mixtures of trichlorosilanes can also be employed. For example a mixture of methyltrichlorosilane and ethyltrichlorosilane when used in the process of this invention yields a mixture of five compounds namely the compounds of Formula I where R is methyl and ethyl, the compounds of Formula II where both R groups are methyl and both R groups are ethyl and the compound of Formula II where one R is methyl and one R is ethyl.

Preferred temperatures employed in my process are those in the range of $-10°$ C. to $+10°$ C. although temperatures down to $-30°$ C. and up to $60°$ C. can be employed with, however, a lowering of yields. Pressures have not been found to be particularly critical. However, the use of reduced pressures becomes impractical when any of the reactants are highly volatile.

Solvents are not particularly necessary in my process but their use is preferred in order to provide ease of handling of the reactants and products, ease of reaction and higher yields of product. The solvents are advantageously employed to dissolve the trichlorosilane and hydrogen chloride acceptor (if used) prior to their addition to the formaldehyde and water although they may also be employed to dissolve the formaldehyde and water. The ether solvents such as dimethyl ether, diethyl ether, diisopropyl ether, dioxane, tetrahydrofuran, ethylene glycol dimethyl ether and the like have been found to give the best results. Hydrocarbon and chlorinated hydrocarbon solvents have also proven to be useful but in some specific instances provide difficulties in handling reaction mixtures in which they are employed. For example, benzene freezes at about $5°$ C. and toluene tends to form emulsions. The solvents most preferred are water-immiscible ether solvents such as diethyl ether, diisopropyl ether, methyl butyl ether and the like.

The compounds of Formulas I and II are stable compounds at room temperature. However, compound I can be converted into compound II by heating compound I to a temperature not greater than $120°$ C. and removing water. Heating to temperatures over $120°$ C. brings about polymerization. Thus, an alternate method for preparing compound II is the heating of compound I as described above.

My silatrioxanes can be polymerized to viscous polymeric oils and insoluble, infusible polymers by heating to elevated temperatures in the range of $100°$ C. to $300°$ C. These polymers are particularly useful as coatings for metals as protection against metal corrosion. They can be heat cured at $100°$ C. to $300°$ C. to form hard, protective coatings and, upon heating to higher temperatures (about $700°$ C. and higher), the coating becomes extremely heat resistant thus providing protection to metals even after heating to extremely high temperatures in the range of about $800°$ C. to $1000°$ C.

The silatrioxanes of this invention can also be mixed with organic amines, especially polyamines, and cured to infusible, insoluble resins which are useful as coatings particularly for metals. The compounds of Formulas I and II have been found to be compatible with many organic compounds and, in fact, in many cases dissolve such organic compounds. Thus these silatrioxanes when mixed with organic amines form homogeneous mixtures which cure at room temperature to hard, infusible, insoluble coatings. My compounds are also compatible with epoxy compounds such as the diglycidyl ethers of 2,2-bis(hydroxyphenyl) propane and mixtures of my compounds therewith cure with organic amines or polyhydric alcohols to form hard, infusible, insoluble resins which are useful as protective coatings for metals. Some mixtures of my compounds with epoxy compounds and organic amines have been found to cure at room temperature.

An especially outstanding property of my silatrioxanes is their compatibility with a large number of organic compounds including synthetic organic resins, organosilicon compounds, fish oils and drying and non-drying vegetable and animal oils. Examples of organic compounds which are compatible with my compounds are linseed oil, chinawood oil, tung oil, epoxy compounds, phenol-formaldehyde resins, melamine-formaldehyde resins, urea-formaldehyde resins, polyvinyl chloride resins, siloxane resins, and the like. The silatrioxanes when added to such synthetic organic resins improve the heat resistance and water repellency of said resins. In polyvinyl chloride resins my novel compounds are effective as heat and light stabilizers.

One particularly advantageous use of my silatrioxanes is as a cross-linking agent for silanol group-containing silicone resins such as the cohydrolyzates of monofunctional, difunctional, trifunctional, and tetrafunctional silanes such as the mono-, di-, tri-, and tetra-chlorosilanes. Heretofore, metallic catalysts, e.g. cobalt naphthenate, have been employed as condensation catalysts in such resin systems. Cure times of resin systems employing metallic condensation catalysts are from 3 to 5 hours at $200°$ C. and severe discoloration of the resin occurs. Employing my silatrioxanes to cure or condense the above-described silicone resins, cure times of only 1 to 2 hours and temperatures of only $150°$ C. are required. Furthermore, the cured silicone resins obtained through the use of the silatrioxanes are clear and free of any discoloration.

The silatrioxanes of this invention are also useful as tanning agents for leather, and in addition render the tanned leather water-repellent. The leather is prepared for tanning by any convenient procedure and the silatrioxane of this invention is then applied to the leather, preferably as a solution of the silatrioxane in a volatile, polar, organic solvent such as ethers (including the ethers described hereinabove with reference to solvents for the trichlorosilane and hydrogen chloride acceptors used in my process for producing silatrioxanes), alcohols, ketones and the like. The concentration of silatrioxane in solution is not critical and can vary over wide limits. The silatrioxane solution can be applied to the leather by brushing, spraying and the like, or the leather can be immersed in the silatrioxane solution for a short time. The leather to which the tanning solution has been applied is then dried by conventional procedures. An outstanding property of leather tanned by the above described method is its retention of flexibility even after being heated through the shrinkage temperature in a standard water shrinkage test.

The following examples are presented. In the examples, the commercially available reactant "Methyl Formcel" is a source of formaldehyde composed of 12 weight percent water, 33 weight percent methanol and 55 weight percent dissolved formaldehyde.

*Example 1*

About 145 grams of Methyl Formcel were placed in a flask fitted with a thermometer, stirrer and dropping funnel and the liquid was cooled to −20° C. About 75 grams of CH₃SiCl₃ and about 120 grams of pyridine were mixed in the dropping funnel and this mixture was added slowly to the well stirred Methyl Formcel. A temperature between −10 and 0° C. was maintained. Soon pyridine hydrochloride precipitated and a slurry formed.

Next 150 grams of isopropyl ether and 500 grams of water were added to the stirred mixture. The mixture was then transferred to a large separatory funnel and the layers were separated. The clear ether layer was then washed twice with water in order to eliminate the remainder of the pyridine hydrochloride and excess pyridine and methanol. The isopropyl ether solution was then dried with anhydrous CaCl₂ and filtered. The solvent was then removed by vacuum distillation at 30° C., and the vacuum was maintained, after evaporation of the solvent for one hour to eliminate the last traces of pyridine. The resulting product was a colorless oil which was identified by infrared spectrographic and elemental analysis as a mixture containing the two compounds

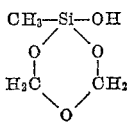

and

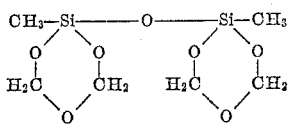

EXAMPLE 2

Following the procedure of Example 1, about 200 grams of Methyl Formcel were cooled to −20° C. and a mixture of about 140 grams of phenyltrichlorosilane and about 160 grams of pyridine was added slowly to the Methyl Formcel. The temperature was maintained between −10° C. and 0° C. during the addition. When the addition was completed about 100 grams of isopropyl ether and about 300 grams of water were added. The ether layer was separated, washed three times with 100 milliliter portions of water, dried and filtered. The ether solvent was then removed under reduced pressure to yield 62 grams of oily product. The oil was found by elemental and infrared spectrographic analysis to contain the compound

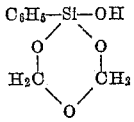

*Example 3*

Following the procedure of Example 1, a mixture of about 162 grams of vinyltrichlorosilane and about 240 grams of pyridine was added slowly to about 186 grams of Methyl Formcel. The reaction mixture became viscous during the addition of the vinyltrichlorosilanepyridine solution, and about 200 grams of isopropyl ether were introduced into the reaction vessel before completing this addition. The final reaction mixture was extracted with four 100 gram portions of isopropyl ether. The combined extracts were washed with water, dried and filtered and the solvent was removed under reduced pressure. The product was 130 grams of oily liquid which contained the two compounds

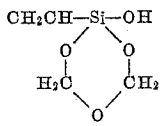

and

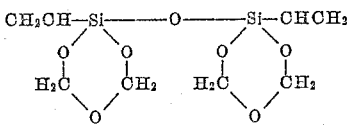

*Example 4*

A leather tanning solution was prepared comprising diisopropyl ether solvent containing about 25 weight percent of a silatrioxane mixture of

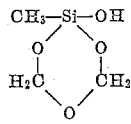

and

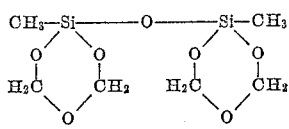

prepared according to the method of Example 1. A sample of solvent-extracted raw hide was immersed in this solution, drained, and allowed to dry. The leather was uniformly tanned and was water repellent. The tanned sample was subjected to a standard water shrinkage test and the leather remained highly flexible after the shrinkage test.

What is claimed is:

1. An organosilicon compound having the formula:

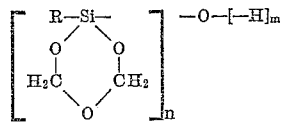

where R is a monovalent hydrocarbon group containing from 1 to about 10 carbon atoms, $m$ is a integer having a value from 0 to 1, $n$ is an integer having a value from 1 to 2, and the sum of $n$ and $m$ is 2.

2. A compound in accordance with claim 1, wherein R is methyl.

3. A compound in accordance with claim 1, wherein R is phenyl.

4. A compound in accordance with claim 1, wherein R is vinyl.

5. An organosilicon compound having the formula:

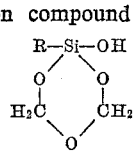

where R is a monovalent hydrocarbon group containing from 1 to about 10 carbon atoms.

6. An organosilicon compound having the formula:

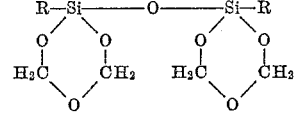

where R is a monovalent hydrocarbon group containing from 1 to about 10 carbon atoms.

7. A process for making silatrioxanes comprising reacting formaldehyde, RSiCl₃ where R is a monovalent hydrocarbon group containing from 1 to about 10 carbon atoms and water in an amount of not more than 3 moles of water per mole of RSiCl$_3$ at a temperature of from −30° C. to 60° C. and continuously removing hydrogen chloride from the reaction.

8. A process for making silatrioxanes comprising reacting formaldehyde, RSiCl$_3$ where R is a monovalent hydrocarbon containing from 1 to about 10 carbon atoms and water in an amount of not more than 3 moles of water per mole of RSiCl$_3$ at a temperature of from −10° C. to +10° C. and continuously removing hydrogen chloride from the reaction.

9. A process for making silatrioxanes comprising reacting formaldehyde, RSiCl$_3$ where R is a monovalent hydrocarbon containing from 1 to about 10 carbon atoms and water in an amount of not more than 3 moles of water per mole of RSiCl$_3$ at a temperature of from −10° C. to +10° C. and continuously removing hydrogen chloride from the reaction by means of a hydrogen chloride acceptor.

10. A process in accordance with claim 9 wherein said hydrogen chloride acceptor is pyridine.

11. A process for making silatrioxanes comprising reacting formaldehyde, methyltrichlorosilane and water in an amount of not more than 3 moles of water per mole of methyltrichlorosilane at a temperature of from −10° C. to +10° C. and continuously removing hydrogen chloride from the reaction.

12. Process for making silatrioxanes comprising reacting formaldehyde, phenyltrichlorosilane and water in an amount of not more than 3 moles of water per mole of phenyltrichlorosilane at a temperature of from −10° C. to +10° C. and continuously removing hydrogen chloride from the reaction.

13. Process for making silatrioxanes comprising reacting formaldehyde, vinyltrichlorosilane and water in an amount of not more than 3 moles of water per mole of vinyltrichlorosilane at a temperature of from −10° C. to +10° C. and continuously removing hydrogen chloride from the reaction.

References Cited in the file of this patent
UNITED STATES PATENTS

| | | |
|---|---|---|
| 2,766,259 | Whetstone | Oct. 9, 1956 |
| 2,861,083 | Guest et al. | Nov. 18, 1958 |
| 2,886,401 | Wells et al. | May 12, 1959 |
| 2,956,854 | Plapper et al. | Oct. 18, 1960 |